United States Patent
Reddy et al.

(10) Patent No.: US 9,771,773 B2
(45) Date of Patent: Sep. 26, 2017

(54) DIUTAN AS A RHEOLOGICAL MODIFIER IN SOREL CEMENTS

(71) Applicant: Halliburton Energy Services, Inc., Houston, TX (US)

(72) Inventors: B. Raghava Reddy, The Woodlands, TX (US); Natalie Lynn Pascarella, Houston, TX (US); Antonio Recio, III, Humble, TX (US); Larry Steven Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/310,737

(22) PCT Filed: Jun. 12, 2014

(86) PCT No.: PCT/US2014/042158
§ 371 (c)(1),
(2) Date: Nov. 11, 2016

(87) PCT Pub. No.: WO2015/191071
PCT Pub. Date: Dec. 17, 2015

(65) Prior Publication Data
US 2017/0073567 A1    Mar. 16, 2017

(51) Int. Cl.
*E21B 33/14*    (2006.01)
*C09K 8/467*    (2006.01)
*C04B 28/32*    (2006.01)
*C04B 24/38*    (2006.01)
*C04B 24/34*    (2006.01)
*C04B 103/00*   (2006.01)

(52) U.S. Cl.
CPC .............. *E21B 33/14* (2013.01); *C04B 24/34* (2013.01); *C04B 24/38* (2013.01); *C04B 28/32* (2013.01); *C09K 8/467* (2013.01); *C04B 2103/0079* (2013.01); *C04B 2103/0085* (2013.01)

(58) Field of Classification Search
None
See application file for complete search history.

(56) References Cited

U.S. PATENT DOCUMENTS 5,175,278 A      12/1992  Peik et al.
5,220,960 A *   6/1993  Totten .................... C04B 28/32
                                                                106/687

(Continued)

FOREIGN PATENT DOCUMENTS

WO    2008096165    8/2008

OTHER PUBLICATIONS

International Search Report and Written Opinion of PCT Application No. PCT/US2014/042158 dated Mar. 11, 2015: pp. 1-12.

(Continued)

*Primary Examiner* — Anuradha Ahuja
(74) *Attorney, Agent, or Firm* — Chamberlain Hrdlicka

(57) ABSTRACT

Systems and methods for modifying rheology of a cement slurry are described. Methods may include forming a cement slurry composition and placing the cement slurry composition in a subterranean formation. The cement slurry composition contains water, diutan, and a magnesium oxychloride-based Sorel cement and can have specified properties for a ratio of diutan to water, a thixotropic index value, and a yield point.

11 Claims, 1 Drawing Sheet

FIG. 1

(56) References Cited

U.S. PATENT DOCUMENTS

| | | | |
|---|---|---|---|
| 5,588,488 A * | 12/1996 | Vijn | C04B 24/163 |
| | | | 106/724 |
| 6,664,215 B1 | 12/2003 | Tomlinson | |
| 7,350,575 B1 | 4/2008 | Lewis et al. | |
| 7,350,576 B2 | 4/2008 | Robertson et al. | |
| 7,530,394 B2 | 5/2009 | Santra et al. | |
| 7,544,641 B2 | 6/2009 | Robertson et al. | |
| 7,654,326 B1 | 2/2010 | Santra et al. | |
| 7,789,149 B2 | 9/2010 | Santra et al. | |
| 7,833,344 B2 | 11/2010 | Santra et al. | |
| 7,854,262 B2 | 12/2010 | Santra et al. | |
| 7,893,011 B2 | 2/2011 | Lewis et al. | |
| 2007/0125534 A1 * | 6/2007 | Reddy | C04B 28/06 |
| | | | 166/277 |
| 2008/0156225 A1 * | 7/2008 | Bury | C04B 28/02 |
| | | | 106/14.05 |
| 2008/0308011 A1 | 12/2008 | Brothers et al. | |
| 2009/0197991 A1 * | 8/2009 | Bury | C04B 28/02 |
| | | | 524/2 |
| 2010/0282466 A1 * | 11/2010 | Brenneis | C04B 28/021 |
| | | | 166/293 |
| 2010/0307381 A1 | 12/2010 | Margheritis et al. | |
| 2011/0275736 A1 * | 11/2011 | Iverson | C04B 24/38 |
| | | | 523/130 |
| 2012/0138299 A1 * | 6/2012 | Joseph | C04B 28/06 |
| | | | 166/293 |
| 2013/0312968 A1 * | 11/2013 | Ladva | C09K 8/68 |
| | | | 166/293 |

OTHER PUBLICATIONS

Anonymous, "CP Kelco Diutan Gum," Product Information, CP Kelco, retrieved Nov. 11, 2016: pp. 1-2, <http://cpkelco.com/products/diutan-gum/>.

Diltz et al., "Location of O-acetyl groups in S-657 using the reductive-cleavage method," Carbohydrate Research, 2001, vol. 331: pp. 265-270.

Hewlett, ed., Lea's Chemistry of Cement and Concrete Fourth Edition, Chapter 14: "Special Cements," Elsevier, New York, 1998: pp. 813-820.

* cited by examiner

DIUTAN AS A RHEOLOGICAL MODIFIER IN SOREL CEMENTS

FIELD

The present disclosure relates to systems and methods for wellbore servicing fluids, and, more specifically, to systems and methods for cement compositions.

BACKGROUND

Achieving optimal rheological behavior in cement slurries is imperative to use of cement for drilling and/or cementing. An effective cement system provides isolation between subterranean zones. To effectively utilize cement in a well operation, the cement slurry, upon mixing with water and necessary additives, fillers, etc., must exhibit fluid behavior that allows it to be pumped efficiently downhole without hardening, settling, or damaging equipment and be placed in the desired location where it will set into a hardened material.

Treatment fluids can be used in a variety of subterranean operations. Such subterranean operations can include, without limitation, drilling operations, stimulation operations, production operations, remediation operations, sand control treatments and the like. As used herein, the terms "treat," "treatment," "treating" and other variants thereof refer to any subterranean operation that uses a fluid in conjunction with achieving a desired function and/or for a desired purpose. Use of these terms does not imply any particular action by the treatment fluid or a component thereof unless expressly described as such herein. Illustrative treatment operations can include, for example, fracturing operations, gravel packing operations, acidizing treatments, scale dissolution and removal operations, consolidation operations, conformance control operations, and the like.

When performing a subterranean treatment operation, including those noted above, it can sometimes be desirable to temporarily or permanently block or divert the flow of a fluid within at least a portion of the subterranean formation by forming a fluid seal therein. The formation of a fluid seal can itself be considered a treatment operation. Whether the fluid seal is intended to be temporary or permanent can determine the type of agent used in its formation. Illustrative fluid blocking and diversion operations can include, without limitation, fluid loss control operations, kill operations, conformance control operations, and the like. The fluid that is being blocked or diverted can be a formation fluid that is natively present in the subterranean formation, such as petroleum, gas, or water. In other cases, the fluid that is being blocked or diverted can be a treatment fluid, including the types mentioned above. In some cases, treatment fluids can be formulated to be self-diverting, such that they are automatically directed to a desired location within the subterranean formation.

Providing effective fluid loss control during subterranean treatment operations can be highly desirable. The term "fluid loss," as used herein, refers to the undesired migration or loss of fluids into a subterranean formation and/or a particulate pack. Fluid loss can be problematic in a number of subterranean operations including, for example, drilling operations, fracturing operations, acidizing operations, gravel-packing operations, workover operations, chemical treatment operations, wellbore clean-out operations, and the like. In fracturing operations, for example, fluid loss into the formation matrix can sometimes result in incomplete fracture propagation. Formation of a fluid seal in such treatment operations can mitigate the migration of a fluid into an unwanted location of the subterranean formation.

Likewise, in the reverse of a fluid loss event, incomplete fluid blocking can result in production of an unwanted fluid from one or more zones of a subterranean formation. For example, incomplete formation of a fluid seal may result in the unwanted incursion of formation water or brine into a wellbore, which may decrease the value of a hydrocarbon resource produced therefrom.

Certain non-hydraulic cements (e.g., Sorel cements) may be designed to remain as a low viscosity fluid during placement. The cement slurry may then sets rapidly at a given formation temperature. The transition from fluid state to solid state may be almost immediate, resulting in essentially zero gas migration or channeling. This "right angle set" occurs because the setting process is highly exothermic. Due to low viscosity, however, the fluid may have a tendency to flow to the low side in a horizontal well. This may result in incomplete sealing of high side of the horizontal well allowing for undesired fluids flow into the well through the unsealed portions. It is important that, once placed, the fluid retain its shape without flowing to lower side of the wellbore. The fluid preferably seals the zone uniformly upon hardening. This will require the fluid possess shear thinning or pseudoplastic rheological properties to prevent slumping. Even though viscosifiers such as xanthan have been used to prevent particle settling of insoluble components (magnesium oxide) of the fluid, the rheology of the resulting viscous fluid may not prevent slumping of the fluid in a horizontal well.

BRIEF DESCRIPTION OF THE DRAWINGS

The accompanying drawings, which are included to provide a further understanding of the disclosure and are incorporated in and constitute a part of this specification, illustrate preferred embodiments of the disclosure and together with the detailed description serve to explain the principles of the disclosure. In the drawings.

DETAILED DESCRIPTION OF THE PREFERRED EMBODIMENTS

Figures 1, 2:
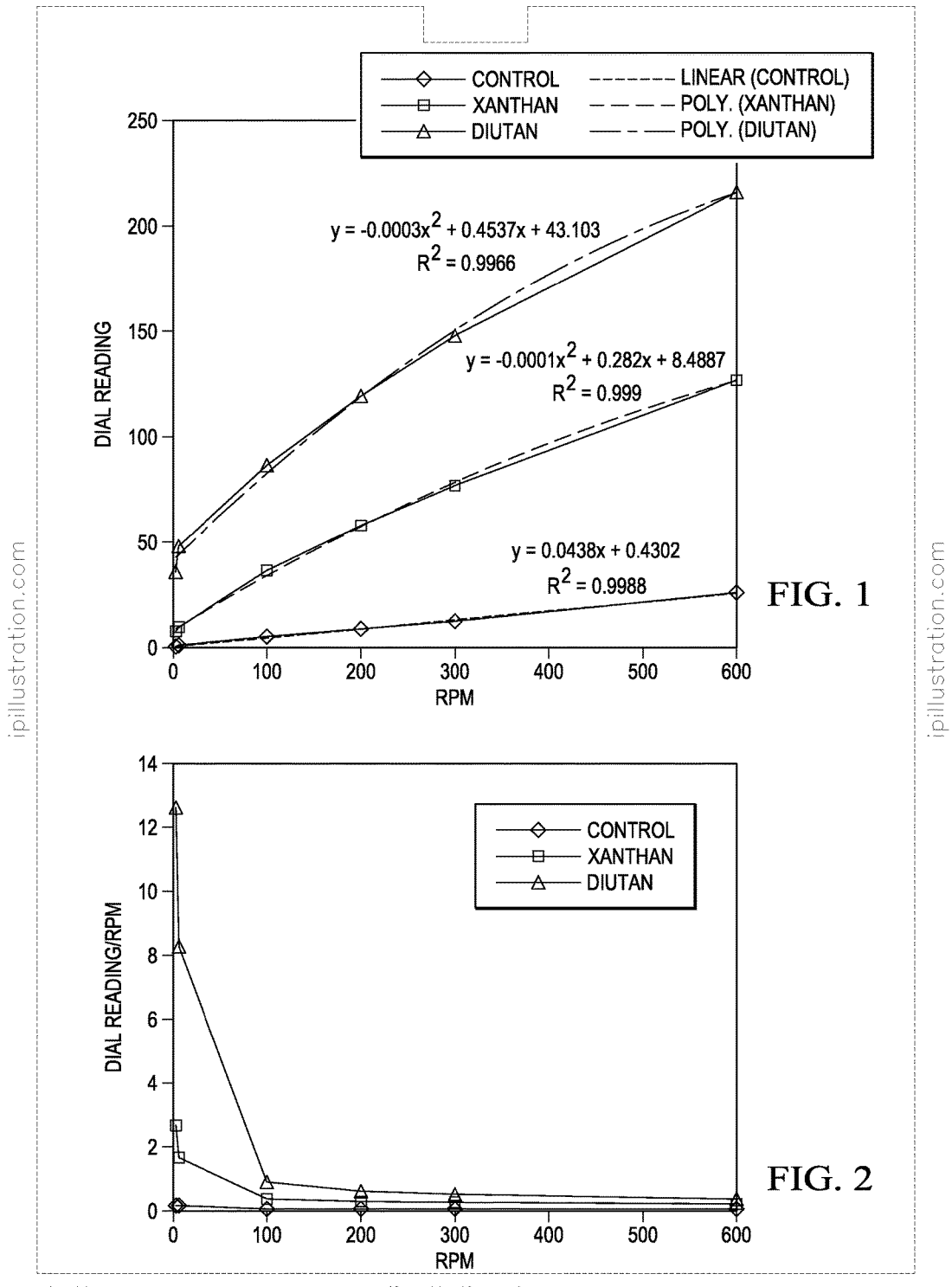
FIG. 1 is a graph of rheological data obtained for the three slurries and reported in Tables 2, 4 and 6 according to an exemplary embodiment.
FIG. 2 is a graph of rpm values versus dial reading values divided by rpm according to an exemplary embodiment.

Systems and methods are described for cement slurries based on non-hydraulic cements. The non-hydraulic cement slurries may comprise one or more additional components. In certain embodiments, the one or more additional components may include high molecular weight polysaccharides, such as diutan biopolymer. The one or more additional components may impart desirable rheological properties for the cement slurry, including reduction and/or prevention of slumping. The one or more additional components may operate synergistically with the Sorel cement to improve slurry rheological properties. The examples described herein relate to cement slurry additives for illustrative purposes only. The systems and methods may be used wherever reduction of settling and slurry pumping modifications for cement compositions are desirable. Embodiments may be utilized to provide optimal rheology for non-hydraulic settable cement settable fluids because of the ability to mitigate and/or eliminate slumping.

Non-hydraulic cements (e.g., gypsum plaster, Sorel cements) harden because of hydration, but too much water cannot be present, and the set material must be kept dry to retain sample integrity and strength. A non-hydraulic cement produces hydrates that are not resistant to water. If the proportion of water to a non-hydraulic cement is too high (that is, significantly higher than the structural requirements of hydrated product), the cement composition will not set into a hardened material. Non-hydraulic cements also require more than one reactive component in addition to water to harden and set, and are often referred to as Chemical Cements.

Hydraulic cements (e.g., Portland cement) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water.

Suitable examples of non-hydraulic or chemical cements include magnesium oxychloride cements (alternately called Sorel cements), magnesium oxysulfate cements, zinc oxychloride cements, aluminum oxychloride cements, silicophosphate cements, calcium phosphate cements, and magnesium phosphate cements such as magnesia ammonium phosphate cements and magnesia tripolyphosphate cements.

One or more illustrative embodiments incorporating the features of the present disclosure are presented herein. Not all features of a physical implementation are described or shown in this application for the sake of clarity. It is to be understood that in the development of a physical embodiment incorporating the features of the present disclosure, numerous implementation-specific decisions must be made to achieve the developer's goals, such as compliance with system-related, business-related, government-related and other constraints, which may vary by implementation and from time to time. While a developer's efforts might be time-consuming, such efforts would be, nevertheless, a routine undertaking for one of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

As discussed above, slumping can be a significant problem when forming a fluid seal from a low viscosity cement slurry composition and can compromise the likelihood of success in various subterranean operations. Slumping of a cement slurry composition in a wellbore may be mitigated and/or eliminated by increasing a treatment fluid's viscosity in a thixotropic manner.

Embodiments described herein may provide non-hydraulic Sorel cement slurry compositions also known as magnesia cements that include magnesium chloride and magnesium oxide. The Sorel cement slurry compositions as described herein may provide improved slurry workability, while minimizing or preventing slumping, and may allow for enhanced pumping and downhole shape-compliant placement. Improved rheology may be achieved due to shear thinning properties of the cement slurry composition. Cement compositions as described herein can be mixed off-site and transported to the well site or mixed on-site. Due to the variety of variables such as, the location of mixing, interventions required, such as stirring, agitating, etc., and additives needed to keep the cement composition viable under downhole conditions that may include water composition and wellbore temperature, the cement slurry composition may be altered from a traditional Sorel cement composition to include a variety of additives. The additives may include set retarders, water resistant (or water-proofing materials), density altering materials, foaming surfactants and the like. Examples of set retarders include organic acids such as gluconic acid, tartaric and citric acid, inorganic phosphates such as sodium tripolyphosphate or sodium hexametaphosphate or combination and aminoalkylenephopshonates. Examples of additives which improve water-resistance of set cement include sodium hexametaphosphate, phosphoric acid, borax, sodium trimethylsilanoate, and cationic latexes. Examples of density altering materials include density reducing materials such as hollow glass or fly ash beads or a gas phase such as air or nitrogen gas; and density increasing agents such as barium sulfate, iron oxides (e.g., haemetite), and manganese oxides (e.g., hausmannite). In a preferred embodiment, the cement composition comprises components of Sorel cement, namely magnesium oxide and magnesium chloride, a set retarder, a water-resistance enhancing material, diutan and required amount of water. Sorel cement (also known as magnesia cement) is a non-hydraulic chemical cement first produced by Stanislas Sorel in 1867. The cement is typically a mixture of magnesium oxide (burnt magnesia) and magnesium chloride that when mixed with water hardens and sets. After setting, a Sorel cement can withstand up to about 12,000 psi of compressive force, whereas standard Portland cement, which is a hydraulic cement, can only withstand about 5,000 psi.

More particularly, without being limited by any theory, it is believed the main products formed in Sorel cements based on magnesium chloride and magnesium oxide include magnesium hydroxide ($Mg(OH)_2$), a 3-form magnesium oxychloride of composition $3Mg(OH)_2.MgCl_2.8H_2O$, and a 5-form magnesium oxychloride product of the composition $5Mg(OH)_2.MgCl_2.8H_2O$. The 5-form product is more preferred product with superior mechanical properties and is primary product formed when the molar ratio of its components are in the ratio $MgO:MgCl_2:H_2O$ equals about 5:1:13 when a slight excess of MgO and an amount of water required to form the 5-form and to convert any excess MgO into $Mg(OH)_2$. For the 3-form, the molar ratio of $MgO:MgCl_2:H_2O$ is 3:1:11.

Magnesium chloride is often used in its hexahydrate form. The weight ratio of magnesium oxide to magnesium chloride hexahydrate is preferably around 1:1.7 to 1.7 to 1, with the most preferred weight ratio being about 1:1.

The reactivity of magnesium oxide and the rates of formation of the 3-form or 5-form products depend on its method of production, surface area, particle porosity, particle sizes, exposure to carbon dioxide, as well as on surface treatments with process aids. The particle size range of magnesium oxide is preferably in the range of 50 nanometers to about 100 microns. Such particles may be pre-coated with organic materials such as fatty acids, for example, stearic acid.

A discussion of various magnesia-based cements can be found, for example, in Lea's Chemistry of Cement and Concrete by Peter Hewlett: Fourth Edition, pages 813-820: 1998: Elsevier Publishing.

In an embodiment, the Sorel cement comprises a metal oxide, preferably an alkaline earth metal oxide, and more preferably magnesium oxide. Magnesium oxide can be prepared by calcination of $Mg(OH)_2$ as shown in Reaction 1:

$Mg(OH)_2 + Heat \rightarrow MgO + H_2O$  (Reaction 1)

The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. The MgO may be produced by calcining to temperatures ranging between about 1,500° C. to about 2,000° C. The MgO is referred to as "dead-burned" since the majority of the reactivity has been eliminated. Dead-burned MgO has the highest degree of crystallinity of the three grades of burned MgO. An example of a dead-burned MgO includes without limitation THERMATEK HT™ additive which is commercially available from Halliburton Energy Services. A second type of MgO produced by calcining at temperatures ranging from about 1,000° C. to about 1,500° C. is termed "hard-burned" and displays an intermediate crystallinity and reactivity when compared to the other two grades of burned MgO. An example of a hard-burned MgO includes without limitation THERMATEK LT™ additive which is commercially available from Halliburton Energy Services. The third grade of MgO is produced by calcining at temperatures ranging from about 700° C. to about 1,000° C. and is termed "light-burned" or "caustic" magnesia. Light-burned MgO is characterized by a high surface area, a low crystallinity, and a high degree of reactivity when compared to the other grades of burned MgO. In embodiments, the MgO for use in a Sorel cement comprises hard-burned MgO, light-burned MgO, dead-burned MgO, or combinations thereof.

In an embodiment, the Sorel cement comprises a magnesium chloride compound, preferably magnesium chloride ($MgCl_2$) or magnesium chloride hexahydrate ($MgCl_2 \cdot 6H_2O$). Magnesium chloride hexahydrate is well known and available from a wide variety of sources. For example, a suitable $MgCl_2 \cdot 6H_2O$ for use in this disclosure is C-TEK™ commercially available from Halliburton Energy Services.

In an embodiment, the Sorel cement is formed through contacting magnesium oxide and a magnesium chloride compound present in a non-aqueous fluid with water as described in more detail later herein. In such an embodiment, the Sorel cement may comprise MgO and $MgCl_2 \cdot 6H_2O$ present in a ratio of about 2:1 MgO:$MgCl_2 \cdot 6H_2O$, alternatively about 1.5:1 MgO:$MgCl_2 \cdot 6H_2O$ and, alternatively about 1:1 MgO:$MgCl_2 \cdot 6H_2O$. Examples of Sorel cements comprising MgO (e.g., THERMATEK HT™ additive, THERMATEK LT™ additive) and $MgCl_2 \cdot 6H_2O$ (e.g., C-TEK) include without limitation THERMATEK™ rigid setting fluids commercially available from Halliburton Energy Services.

Certain embodiments may utilize diutan as an additive to impart pseudoplasticity (shear thinning) and thixotropy to Sorel cements. Diutan is a high molecular weight polysaccharide. Diutan may exhibit a hexameric repeat unit with four sugars in the backbone (glucose-glucuronic acid-glucose-rhamnose) and a side chain of two rhamnose residues attached to one of the glucose residues. Details of the diutan gum structure may be found in an article by Diltz et al., "Location of O-acetyl Groups in S-657 Using the Reductive-Cleavage Method," Carbohydrate Research, Vol. 331, P. 265-270 (2001). Details of preparing the diutan gum may be found in U.S. Pat. No. 5,175,278, which is hereby incorporated by reference in its entirety. Diutan gum belongs to a class of rheology modifying agents possessing pseudoplastic behavior. Pseudoplastic (shear thinning) materials are characterized by viscosity which increases and decreases virtually instantaneously in response to the removal and application of shear. This property results in fluids which readily flow but are capable of suspending or stabilizing components under static conditions. Diutan may improve the performance of particulate-laden slurries by controlling flow, segregation, sedimentation and bleed. In addition, diutan containing treatment fluids may develop a higher degree of pseudoplasticity, greater low shear rate viscosity (LSRV), and improved viscosity retention at elevated temperatures when compared to traditional polymeric rheology modifiers used in drilling, workover or completion fluids.

Certain embodiments herein describe the method of use, and composition of, magnesium oxychloride (magnesium chloride and magnesium oxide combination)-based Sorel cement for use in deviated or substantially horizontal wells in subterranean formations. Substantially deviated wells may be defined as those wells for which vertical depth is less than measured true depth, and represent wells in which the trajectory of well deviates from the vertical portion of the well by an angle. When the angle of deviation is about 85° or greater, such wells may be called horizontal wells, and such wells represent special cases of deviated wells. Embodiments may also be useful for substantially vertical wells in subterranean formations. For purposes of this disclosure, 'substantially vertical wells' are those wells, or portions of the wells which are drilled and completed at right angles to surface of the earth, and a line can be drawn from top to bottom of the well. Sorel cement-based rigid setting fluids may be useful for a wide range of problems encountered when drilling or producing fractured, unconsolidated or watered out formations. These fluids may also be used for plugging and abandonment operations. Diutan biopolymer may also be included in certain non-hydraulic cement slurries to impart thixotropic properties and viscosity to the cement slurry, which is then allowed to set.

In certain embodiments, magnesium oxychloride Sorel cement formulated with diutan additive may both viscosify and impart thixotropic properties to traditionally water-thin Sorel cement formulations. It is to be noted that all thixotropic fluids are pseudoplastic (shear thinning), and differ from the latter in the time-dependence behavior of viscosity, which may manifest as a yield point under low shear or static conditions due to buildup of internal structure in thixotropic fluids. Thixotropicity of a fluid may be indicated by Thixotropic Index, which is obtained by dividing viscosity of a fluid at a lower shear rate (or revolutions per minute or rpm) by viscosity at a higher shear rate (or rpm) where the ratio of high shear rate to lower shear rate is at least 10. In an embodiment, the non-hydraulic cement slurry comprising diutan has a Thixotropic Index values greater than 2, alternately greater than 4, or alternately greater than 5 when the values were calculated using rheology measurements with coaxial rheometers. An example of a suitable coaxial rheometer is Fann 35 rheometer manufactured by Fann Instruments.

Diutan may impart thixotropic properties such that increasing shear stress or shear rate decreases the viscosity of the cement slurry. Decreasing the shear stress may increase and restore the initial viscosity of the cement slurry. The viscosified and thixotropic Sorel cement may be useful in water shutoff treatments and/or in wells with deviated or horizontal sections.

In addition to viscosification and thixotropicity, diutan may also impart yield stresses to the non-hydraulic cement slurries. Yield stress represents minimum stress values which must be exceeded before the slurry begins to flow. Slurries with yield stress values are important in minimizing slump or sag when such slurries are placed in a horizontal or deviated well. While there are several rheological methods are available for measuring yield stresses (also called Yield Points), the preferred method is as described API Recommended Practice for Testing Well Cements 10B-2. According to this method, the Yield Point of cement slurry in units of lbs/100 ft$^2$ can be obtained by subtracting Plastic Viscosity value (in centipoise) from the dial reading at 300 rpm measured by using a Fann 35 Rheometer. The Plastic Viscosity value (in centipoise) is obtained by subtracting the dial readings at 300 rpm form that at 600 rpm. In an embodiment, the cement slurry comprising diutan has a value greater than 25 lbs/100 ft$^2$, alternately greater than 50 lbs/100 ft$^2$ or alternately greater than 75 lbs/100 ft$^2$.

An exemplary non-hydraulic cement formulation may include sufficient diutan to provide a cement slurry that will exhibit a Thixotropic Index greater than 2, alternately greater than 4, or alternately greater than 5. The Thixotropic Index may be calculated using rheology measurements with coaxial rheometers. An exemplary formulation may also have a Yield Point greater than 25 lbs/100 ft$^2$, alternately greater than 50 lbs/100 ft$^2$ or alternately greater than 75 lbs/100 ft$^2$. In an exemplary Sorel cement composition, magnesium oxide, magnesium chloride and water are mixed in a molar ratio of 5:1:13 to maximize the formation of 5-form compound magnesium oxychloride product, $5Mg(OH)_2 \cdot MgCl_2 \cdot 8H_2O$. This corresponds to a weight percentage ratio of 37.1%:17.4%:43.5% of magnesium oxide, magnesium chloride and water respectively. However, when magnesium chloride is available as a hydrate, the amount of liquid water may be reduced by the amount present as hydrate so that stoichiometric ratios are maintained. The magnesium oxide can be used in 5% to 50% in excess if desired.

In a preferred embodiment, the cement composition comprises components of Sorel cement, namely magnesium oxide and magnesium chloride, a set retarder, a water-resistance enhancing material, diutan and required amount of water to provide a cement slurry that will exhibit a Thixotropic Index greater than 2, alternately greater than 4, or alternately greater than 5; and an Yield Point greater than 25 lbs/100 ft$^2$, alternately greater than 50 lbs/100 ft$^2$ or alternately greater than 75 lbs/100 ft$^2$.

EXAMPLES

Magnesium oxide designated for low temperature applications may have smaller particle sizes, such as approximately 50 microns and very reactive surfaces. These low temperature magnesium oxides were found to be more reactive as evident from shorter gel times at low temperatures, and rheological characterization was complicated by the tendency of slurry to begin setting too prematurely. On the other hand, magnesium oxide designated for high temperature applications may have larger particle sizes and less reactive surface. These high temperature magnesium oxides may be heat treated to reduce reactivity ("dead burnt"). The thixotropic behavior with diutan appeared to be more predominant with high temperature material. All rheological studies were performed on slurries containing low reactivity 'dead burnt' magnesium oxide. Approximately 350 g of magnesium oxide ('dead burnt'), and approximately 350 g of magnesium chloride hexahydrate were slurried in approximately 233 mL of water to prepare a Control slurry. The formulation is given in Table 1. The formulations for diutan or xanthan containing slurries are provided in Tables 3 and 5. The polymers were prehydrated in water prior to addition of the magnesium compounds. The slurries were subjected to rheological characterization using Fann 35 rheometer. The results are provided in Tables 2, 4 and 6. The composition may also include other additives known to one of skill in the art of cement compositions.

Table 1 outlines a formulation of non-viscosified Sorel cement control fluid. The rheological values obtained from a Chandler 3500 are listed in Table 2. The values obtained are representative of a thin non-viscous fluid.

TABLE 1

| Sorel cement without viscosifier (control) | |
|---|---|
| Deionized H$_2$O | 233 mL |
| Diutan | 0 g |
| Magnesium oxide (dead burnt) | 350 g |
| Magnesium chloride•hexahydrate | 350 g |

TABLE 2

| Rheology (RPM): Sorel Cement without viscosifier | | | | | | |
|---|---|---|---|---|---|---|
| 600 | 300 | 200 | 100 | 6 | 3 | 3 |
| | | | | | | 30 s gel strength |
| 27 | 13 | 9 | 5 | 1 | 0.5 | 0.5 |
| 27 | | | | | | |

Table 3 describes an exemplary formulation of a xanthan-viscosified Sorel cement. The rheological values obtained from a Chandler 3500 are listed in Table 4. The values obtained are representative of a fluid that is more viscous than the unmodified Sorel cement (Table 1). This formulation, however, failed to exhibit any thixotropic properties both visually, as well as rheologically.

TABLE 3

| Sorel cement with viscosifier | |
|---|---|
| Deionized H$_2$O | 233 mL |
| Xanthan | 1.17 g |
| Magnesium oxide (dead burnt) | 350 g |
| Magnesium chloride | 350 g |

TABLE 4

| \multicolumn{7}{c}{Rheology (RPM): Sorel Cement with viscosifier} |
|---|---|---|---|---|---|---|
| 600 | 300 | 200 | 100 | 6 | 3 | 3 |
|  |  |  |  |  |  | 30 s gel strength |
| 132 | 1380 | 60 | 38 | 10 | 8 | 8 |
| 132 |  |  |  |  |  |  |

Table 5 describes an exemplary formulation using diutan with Sorel cement. In certain embodiments, components may be selected and added in predetermined amounts/ratios based on desired characteristics of the formulation. In certain embodiments, the ratio of $MgCl_2$ to MgO may be approximately 2:1 to approximately 1:2, or approximately 1:1. In certain embodiments, the ratio of water to other components may be varied. In certain embodiments, the ratio of diutan to water may be approximately 1 g:50 mL to approximately 1 g:200 mL, approximately 1 g:75 mL to approximately 1:150 mL, approximately 1 g:100 mL to approximately 1 g:125 mL, or approximately 1 g: 117 mL. Similarly, the weight ratio of diutan to Sorel cement may be varied. In certain embodiments the weight ratio of diutan to Sorel cement may be approximately 1:350. In certain embodiments, the weight ratio of diutan to Sorel cement may be approximately 1:100 to approximately 1:600, approximately 1:200 to approximately 1:500, approximately 1:300 to approximately 1:400, or approximately 1:325 to approximately 1:375. Additional description of formulation components and compositions may be found in the following patents, which are incorporated by reference in their entireties: U.S. Pat. No. 7,350,575, U.S. Pat. No. 7,350,576, U.S. Pat. No. 7,530,394, U.S. Pat. No. 7,544,641, U.S. Pat. No. 7,654,326, U.S. Pat. No. 7,789,149, U.S. Pat. No. 7,833,344, U.S. Pat. No. 7,854,262, U.S. Pat. No. 7,893,011, U.S. Pat. No. 6,664,215, and WO2008096165.

Addition of diutan to the Sorel cement slurry increases viscosity as shown in Table 6. The second dial reading at 600 RPM shown in Table 6 was taken after 30 sec gel strength measurement at 3 RPM. The thixotropic characteristic of the formulation was clearly apparent in visual observation during the slurry preparation phase, as well as during the rheological characterization phase.

TABLE 5

| \multicolumn{2}{c}{Sorel cement with diutan} |  |
|---|---|
| Deionized $H_2O$ | 233 mL |
| Diutan | 2 g |
| Magnesium oxide (dead burnt) | 350 g |
| Magnesium chloride | 350 g |

TABLE 6

| \multicolumn{7}{c}{Rheology (RPM): Sorel Cement with diutan} |
|---|---|---|---|---|---|---|
| 600 | 300 | 200 | 100 | 6 | 3 | 3 |
|  |  |  |  |  |  | 30 s gel strength |
| 225 | 154 | 124 | 90 | 50 | 38 | 39 |
| 300+ |  |  |  |  |  |  |

The addition of the diutan, such as described in Table 5, imparted "lipping gel" character to the formulation after slurry preparation. The addition of diutan to the Sorel cement formulation allowed the material to hold shape without slumping to the low side when placed horizontally and heated for 2 hours at 180° F. Note that the Sorel cement formulation was still in a pumpable phase prior to being "set".

During rheological measurements, at low RPM values, the slurry beyond the immediate vicinity of the bob developed enough gel strength during the measurement to become immobile resulting in formation of a "finger hole" where the bob was spinning. The viscous mixture (no shear) became more fluid-like when shear stress was applied as seen by a thin fluid on the bob after measurement. Increased shear stress converted the viscous mixture to a much less viscous material. As the shear stress was reduced, the formulation regained a viscous consistency. The composition formulated with xanthan as viscosifier did not display the same thixotropic nature as did the diutan composition.

The rheological data obtained for the three slurries and reported in Tables 2, 4 and 6 are graphically presented in FIG. 1. A trend line fit analysis and the corresponding best-fit equations are also shown in FIG. 1. The analysis indicates that the Control slurry rheology shows linear relationship between rpm and dial readings that represent torque or shear stress indicating Newtonian fluid characteristics, and dial readings indicate low viscosity values. Such slurry is prone to suffer extreme slump similar to water-thin fluids when placed in horizontal well. The xanthan and diutan slurries show non-linear relationship between rpm values and dial readings, indicating non-Newtonian rheological behavior. In FIG. 2, rpm values are plotted as independent variable along X-axis, and Dial Reading values divided by rpm as dependent variable along Y-axis. The Y-axis values in FIG. 2 represent a measure of slurry viscosity since they represent shear stress (torque) to shear rate (rpm) ratios. The graphs clearly indicate shear thinning nature of slurries containing xanthan and diutan. The diutan containing slurry shows very high viscosities at low rpm values compared to xanthan slurry and very low viscosities, similar to those of xanthan at high shear conditions (high rpm). This behavior indicates the possibility of high Thixotropic Index values, and high Yield Point values for diutan containing slurry.

Thixotropic Index values were calculated by dividing [Dial Reading/RPM–a measure of viscosity] at 3 rpm by the corresponding values at 30 rpm (value calculated from the polynomial equations shown in FIG. 1). The Yield Point values were calculated according to the API Recommended Practice 10 B-2 for testing well cements using Dial Readings at 300 rpm and 600 rpm. The Thixotropic Index values and Yield Point values are given in Table 7.

TABLE 7

| Slurry | Thixotropic Index | Yield Pont (lbs/100 ft$^2$) |
|---|---|---|
| Control | 0.40 | −1 |
| 'Xanthan Slurry' | 4.7 | 28 |
| 'Diutan Slurry' | 6.8 | 83 |

The results in Table 7 clearly show the superior performance of diutan in imparting high thixotropicity and Yield Point to the Sorel cement slurry. This suggests rapid buildup of strong internal structure upon removal of shear, which would be expected to happen when the slurry exits tubular conduit during pumping and placement. The rapid internal structure development resulting in a viscous material with a high yield stress can assure retention of shape and resistance to slump and sag to the low side.

Three slurries of formulations of the control sample, xanthan formulation, and diutan formulation were mixed and allowed to set in closed plastic bottles in a water bath at 175° F. Qualitative thickening time measurements by estimating firmness of the set sample indicated that all slurries had similar set times (approximately 3 hrs).

Certain embodiments of the present invention may be utilized for different purposes. The following are illustrative examples of potential uses, but this list is not meant to be exhaustive.

In certain embodiments, a thixotropic Sorel cement product may serve as a permanent plug (sealant) for zonal isolation in horizontal wells.

A thixotropic Sorel cement product may serve as a permanent plug (sealant) for zonal isolation in horizontal wells completed with slotted liners.

A thixotropic Sorel cement product may serve as a permanent plug (sealant) for zonal isolation in horizontal wells completed with gravel pack screens.

Methods described herein may be used for servicing a horizontal wellbore including contacting diutan and Sorel cement. The diutan and Sorel cement may be mixed to provide a cement slurry composition. The Sorel cement may include a magnesium oxychloride slurry in water to form a cement composition via a continuous process. The diutan may impart thixotropic properties to the traditionally water-thin Sorel cement product.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A method of servicing a wellbore located in a subterranean formation, comprising:
    forming a cement slurry composition comprising water, a magnesium oxychloride-based Sorel cement and diutan, wherein the cement slurry composition has:
        a ratio of the diutan to the water of about 1 g:100 mL to about 1 g:125 mL,
        a thixotropic index value of greater than 2 to about 6.8, and
        a yield point of greater than 25 lbs/100 ft$^2$ to about 83 lbs/100 ft$^2$; and
    placing the cement slurry composition in the wellbore located in the subterranean formation.

2. The method of claim 1, further comprising allowing the cement slurry composition to set in the subterranean formation.

3. The method of claim 1, wherein the magnesium oxychloride-based Sorel cement comprises magnesium oxide and magnesium chloride in a weight ratio of approximately 1:1.

4. The method of claim 1, wherein the weight ratio of the diutan to the Sorel cement is about 1:300 to about 1:400.

5. The method of claim 1, wherein the cement slurry composition is placed in a horizontal wellbore.

6. The method of claim 1, wherein the cement slurry composition is placed in a vertical wellbore.

7. The method of claim 1, further comprising mixing the cement slurry composition using mixing equipment.

8. The method of claim 1, wherein the cement slurry composition is placed in the wellbore using one or more pumps.

9. The method of claim 1, wherein the magnesium oxychloride-based Sorel cement comprises magnesium oxide and magnesium chloride in a weight ratio of about 2:1 to about 1:2.

10. The method of claim 1, wherein the cement slurry composition further comprises at least one of a set retarder, a water-resistance enhancing material, or a combination thereof.

11. The method of claim 10, wherein the cement slurry composition comprises the set retarder, and wherein the set retarder is selected from the group consisting of gluconic acid, tartaric acid, citric acid, sodium tripolyphosphate, sodium hexametaphosphate, and any combination thereof.

* * * * *